(12) United States Patent
Su et al.

(10) Patent No.: US 12,487,274 B2
(45) Date of Patent: Dec. 2, 2025

(54) PIXEL DETECTION DEVICE AND PIXEL DETECTION METHOD

(71) Applicant: AUO Corporation, Hsin-Chu (TW)

(72) Inventors: Wen-Chiuan Su, Hsin-Chu (TW);
Yu-Chi Hsiao, Hsin-Chu (TW);
Ling-Ying Chien, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 249 days.

(21) Appl. No.: 18/533,269

(22) Filed: Dec. 8, 2023

(65) Prior Publication Data
US 2024/0377452 A1    Nov. 14, 2024

(30) Foreign Application Priority Data
May 12, 2023   (TW) .................................. 112117829

(51) Int. Cl.
*G01R 31/28*    (2006.01)
*G01R 31/26*    (2020.01)

(52) U.S. Cl.
CPC ..... *G01R 31/2837* (2013.01); *G01R 31/2635* (2013.01)

(58) Field of Classification Search
CPC .... G01R 31/26; G01R 31/28; G01R 31/2837; G01R 31/2635; G09G 3/00; G09G 3/006; G09G 3/32; G09G 2320/029; G09G 2330/12
See application file for complete search history.

(56) References Cited

U.S. PATENT DOCUMENTS

| | | | | |
|---|---|---|---|---|
| 2020/0152101 A1* | 5/2020 | Li | .......... | G09G 3/3233 |
| 2022/0214394 A1* | 7/2022 | Qiu | .......... | G01R 31/2815 |
| 2022/0293058 A1* | 9/2022 | Lee | .......... | G09G 3/3233 |

FOREIGN PATENT DOCUMENTS

| | | | | | |
|---|---|---|---|---|---|
| CN | 115917629 A | * | 4/2023 | .......... | H01L 25/167 |
| CN | 116097344 A | * | 5/2023 | .......... | H10D 86/40 |
| KR | 20230050800 A | * | 4/2023 | .......... | G09G 3/3233 |

* cited by examiner

*Primary Examiner* — Son T Le
(74) *Attorney, Agent, or Firm* — WPAT, PC

(57) ABSTRACT

A pixel detection device includes a substrate. Substrate includes a sub-pixel circuit, a detection transistor, and two second detection boards. Sub-pixel circuit includes a light emitting element. First detection board is coupled to detection transistor. Second detection board is coupled to light emitting element. First detection board outputs a first detecting signal in a sub-stage of a stage, and first detecting signal is switched from a first voltage level to a second voltage level to control a first voltage of detection transistor. Second detection board outputs a second detecting signal at sub-stage, and second detecting signal is switched from second voltage level to first voltage level to control a second voltage of first light emitting element. Detection transistor and light emitting element are conducted according to first voltage and second voltage to light up light emitting element, so as to detect whether brightness of light emitting element is abnormal.

20 Claims, 9 Drawing Sheets

PIXEL DETECTION DEVICE AND PIXEL DETECTION METHOD

CROSS-REFERENCE TO RELATED APPLICATION

This application claims priority to Taiwan Application Serial Number 112117829, filed May 12, 2023, which is herein incorporated by reference in its entirety.

BACKGROUND

Field of Invention

The present disclosure relates to an electronic device and a detection method. More particularly, the present disclosure relates to a pixel detection device and a pixel detection method.

Description of Related Art

Conventional micro-light emitting diode display cannot detect pixel circuits alone during a manufacturing process. In detail, pixel circuit needs to be matched with a sub-pixel circuit for detection. If an abnormal pixel circuit cannot be detected during a manufacturing process, an abnormal pixel circuit will continue to be executed multiple manufacturing processes, which in turn consumes time and process costs.

For the foregoing reason, there is a need to provide a pixel detection device to solve the problems of the prior art.

SUMMARY

One aspect of the present disclosure provides a pixel detection device. The pixel detection device includes a first substrate. The first substrate includes a first sub-pixel circuit, a first detection transistor, a first detection board and a second detection board. The first sub-pixel circuit includes a first light emitting element. The first detection transistor is coupled to the first light emitting element. The first detection board is coupled to the first detection transistor. The second detection board is coupled to the first light emitting element. The first detection board is configured to output a first detecting signal in a first sub-stage of a first stage, and the first detecting signal is switched from a first voltage level to a second voltage level to control a first voltage of the detection transistor. The second detection board is configured to output a second detecting signal in the first sub-stage, and the second detecting signal is switched from second voltage level to the first voltage level to control a second voltage of the first light emitting element. The first detection transistor and the first light emitting element are conducted according to the first voltage and the second voltage to light up the light emitting element, so as to detect whether a brightness of the light emitting element is abnormal.

Another aspect of the present disclosure provides a pixel detection method. The pixel detection method is adapted to a pixel detection device. The pixel detection device includes a first sub-pixel circuit, a first detection transistor, a first detection board and a second detection board. The first sub-pixel circuit includes a first light emitting element. The first detection transistor is coupled to the first light emitting element. The first detection board is coupled to the first detection transistor. The second detection board is coupled to the first light emitting element. The pixel detection method includes following steps: outputting a first detecting signal to the first detection transistor by the first detection board in a first sub-stage of a first stage to control a first voltage of a terminal of the first detection transistor; outputting a second detecting signal to the first light emitting element by the second detection board in the first sub-stage to control a second voltage of a terminal of the first light emitting element; conducting the first detection transistor and the first light emitting element by a voltage difference between the first voltage and the second voltage to light up the first light emitting element; and detecting a brightness of the first light emitting element by a sensor.

In view of the aforementioned shortcomings and deficiencies of the prior art, the present disclosure provides a pixel detection device and a pixel detection method so that abnormal pixel circuits can be detected during a manufacturing process to avoid consuming process costs and time costs.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
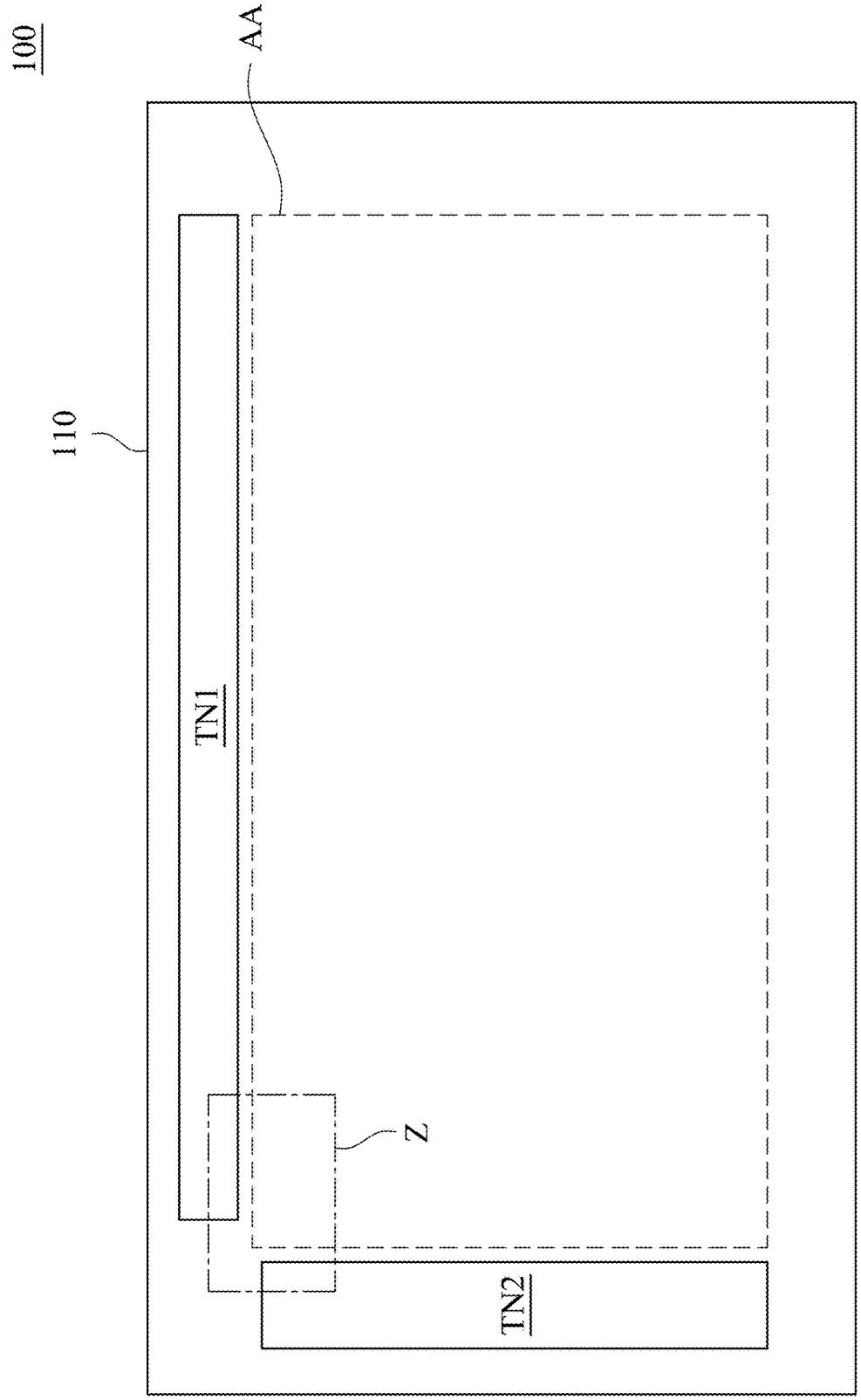
FIG. 1 depicts a schematic diagram of a pixel detection device according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 depicts a schematic diagram of a pixel detection device 100 according to some embodiments of the present disclosure. In some embodiments, the pixel detection device 100 includes a first substrate 110. The first substrate 110 includes a visible area AA, a first test pin header TN1 and a second test pin header TN2.

Figure 2:
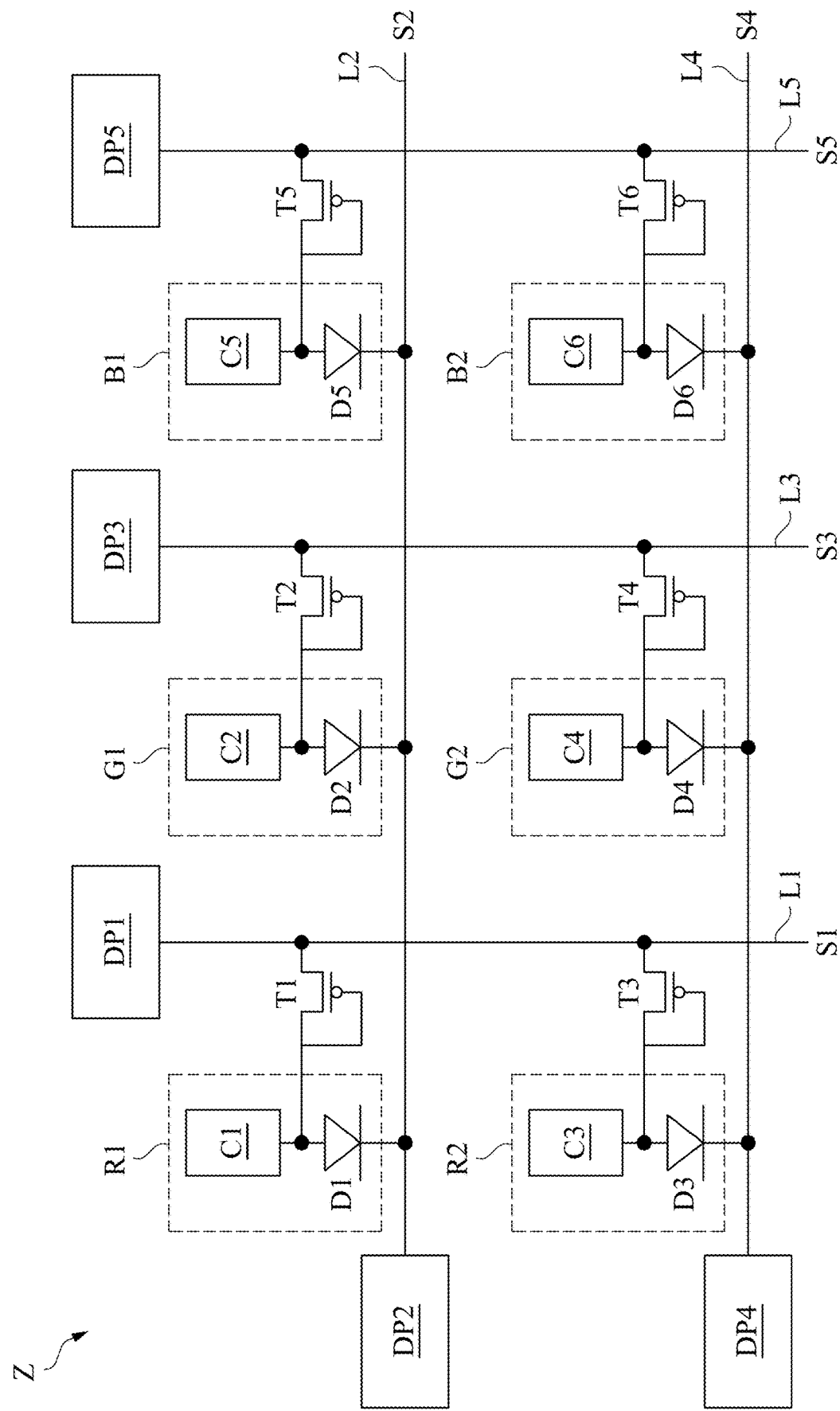
FIG. 2 depicts an enlarged schematic diagram of a part of area of a pixel detection device according to some embodiments of the present disclosure.

FIG. 2 depicts an enlarged schematic diagram of a part of area Z of the first substrate 110 of the pixel detection device 100 in FIG. 1 according to some embodiments of the present disclosure. In some embodiments, in order to facilitate the understanding of a structure of the pixel detection device 100 of the present disclosure, please refer to FIG. 1 and FIG. 2 together, the first substrate 110 in FIG. 1 includes a first sub-pixel circuit R1, a second sub-pixel circuit G1, a third sub-pixel circuit R2, a fourth sub-pixel circuit G2, a fifth sub-pixel circuit B1 and a sixth sub-pixel circuit B2. The first substrate 110 further includes a first detection board DP1, a second detection board DP2, a third detection board DP3, a fourth detection board DP4 and a fifth detection board DP5. The first substrate 110 further includes a first detection transistor T1, a second detection transistor T2, a first detection transistor T3, a first detection transistor T4, a first detection transistor T5 and a sixth detection transistor T6.

In some embodiments, the first detection board DP1, the second detection board DP2, the third detection board DP3, the fourth detection board DP4 and the fifth detection board DP5 are respectively configured to provide a first detecting signal S1, a second detecting signal S2, a third detecting signal S3, a fourth detecting signal S4 and fifth detecting signal S5 to drive the first sub-pixel circuit R1, the second sub-pixel circuit G1, the third sub-pixel circuit R2, the fourth sub-pixel circuit G2, the fifth sub-pixel circuit B1 and the sixth sub-pixel circuit B2 to detect whether these sub-pixel circuits are abnormal.

In some embodiments, please refer to FIG. 2, the first sub-pixel circuit R1 includes a first light emitting element D1 and a first driving circuit C1. Please start form a top end and a right end of each of an element shown in the figure as a first terminal, the first light emitting element D1 includes a first terminal and a second terminal. The first terminal of the first light emitting element D1 is coupled to the first detection transistor T1 and the first driving circuit C1. The second terminal of the first light emitting element D1 is coupled to the second detection board DP2.

In some embodiments, the first detection transistor T1 includes a first terminal, a second terminal and a control terminal. The first terminal of the first detection transistor T1 is coupled to the first detection board DP1. The second terminal of the first detection transistor T1 is coupled to the first terminal of the first light emitting element D1. The control terminal of the first detection transistor T1 is coupled to the second terminal of the first detection transistor T1 and the first terminal of the first light emitting element D1. The first detection transistor T1 is conducted in response to a across voltage between the first terminal and the second terminal of the first detection transistor T1. It should be noted that the first detection transistor T1 is a diode-connected transistor, that is, the first detection transistor T1 and the first light emitting element D1 are equivalent to two diodes in series. The first detection transistor T1 and the first light emitting element D1 are conducted according to the first detecting signal S1 and the second detecting signal S2 to light up the first light emitting element D1 so as to detect whether the first light emitting element D1 is abnormal.

In some embodiments, the second sub-pixel circuit G1 includes a second light emitting element D2 and a second driving circuit C2. Connections between the second light emitting element D2, the second driving circuit C2 and the second detection transistor T2 are similar to connections between the first light emitting element D1, the first driving circuit C1 and the first detection transistor T1, and repetitious details are omitted herein. In addition, connections between the second sub-pixel circuit G1, the third detection board DP3 and the second detection board DP2 are similar to connections between the first sub-pixel circuit R1, the first detection board DP1 and the second detection board DP2, and repetitious details are omitted herein. In some embodiments, the second detection transistor T2 and the second light emitting element D2 are conducted according to the second detecting signal S2 and the third detecting signal S3 to light up the second light emitting element D2 so as to detect whether the second light emitting element D2 is abnormal.

In some embodiments, connections between the fifth light emitting element D5, the fifth driving circuit C5 and the fifth detection transistor T5 are similar to connections between the first light emitting element D1, the first driving circuit C1 and the first detection transistor T1, and repetitious details are omitted herein. In addition, connections between the fifth sub-pixel circuit B1, the fifth detection board DP5 and the second detection board DP2 are similar to t connections between the first sub-pixel circuit R1, the first detection board DP1 and second detection board DP2, and repetitious details are omitted herein. In some embodiments, the fifth detection transistor T5 and the fifth light emitting element D5 are conducted according to the second detecting signal S2 and the fifth detecting signal S5 to light up the fifth light emitting element D5 so as to detect whether the fifth light emitting element D5 is abnormal.

In some embodiments, the first sub-pixel circuit R1, the second sub-pixel circuit G1 and the sub-pixel circuit B1 are located in the same pixel row.

In some embodiments, the third sub-pixel circuit R2 includes a third light emitting element D3 and a third driving circuit C3. The third detection transistor T3 is coupled to the third light emitting element D3 and the first detection board DP1. The fourth detection board DP4 is coupled to the third light emitting element D3.

In some embodiments, the third detection transistor T3 includes a first terminal, a second terminal and a control terminal. The first terminal of the third detection transistor T3 is coupled to the first detection board DP1. The second terminal of the third detection transistor T3 is coupled to the first terminal of the third light emitting element D3. The control terminal of the third detection transistor T3 is coupled to the second terminal of the third detection transistor T3 and the first terminal of the third light emitting element D3. The second terminal of the third light emitting element D3 is coupled to the fourth detection board DP4. The third detection transistor T3 is conducted in response to a cross voltage between the first terminal and the second terminal of the third detection transistor T3. It should be noted that the third detection transistor T3 is a diode-connected transistor, that is, the third detection transistor T3 and the third light emitting element D3 are equivalent to two diodes in series. The third detection transistor T3 and the third light emitting element D3 are conducted according to the first detecting signal S1 and the fourth detecting signal S4 to light up the third light emitting element D3 so as to detect whether the third light emitting element D3 is abnormal.

In some embodiments, the fourth sub-pixel circuit G2 includes a fourth light emitting element D4 and a fourth driving circuit C4. Connections between the fourth light emitting element D4, the fourth driving circuit C4 and the fourth detection transistor T4 are similar to connections between the third light emitting element D3, the third driving circuit C3 and the third detection transistor T3, and repetitious details are omitted herein. In addition, connections between the fourth sub-pixel circuit G2, the third detection board DP3 and the fourth detection board DP4 are similar to connections between the third sub-pixel circuit R2, the first detection board DP1 and the fourth detection board DP4, and repetitious details are omitted herein. In some embodiments, the fourth detection transistor T4 and the fourth light emitting element D4 are conducted according to the fourth detecting signal S4 and the third detecting signal S3 to light up the fourth light emitting element D4 so as to detect whether the fourth light emitting element D4 is abnormal.

In some embodiments, the sixth sub-pixel circuit B2 includes a sixth light emitting element D6 and a sixth driving circuit C6. Connections between the sixth light emitting element D6, the sixth driving circuit C6 and the sixth detection transistor T6 are similar to connections between the third light emitting element D3, the third driving circuit C3 and the third detection transistor T3, and repetitious details are omitted herein. In addition, connections between the sixth sub-pixel circuit B2, the fifth detection board DP5 and the fourth detection board DP4 are similar to connections between the third sub-pixel circuit R2, the first detection board DP1 and the fourth detection board DP4, and repetitious details are omitted herein. In some embodiments, the sixth detection transistor T6 and the sixth light emitting element D6 are conducted according to the fourth detecting signal S4 and the fifth detecting signal S5 to light up the sixth light emitting element D6 so as to detect whether the sixth light emitting element D6 is abnormal.

In some embodiments, the first sub-pixel circuit R1 and the third sub-pixel circuit R2 are located in the same pixel row. The second sub-pixel circuit G1 and the fourth sub-pixel circuit G2 are located in the same pixel row. The fifth sub-pixel circuit B1 and the sixth sub-pixel circuit B2 are located in the same pixel row.

In some embodiments, please refer to FIG. 1 and FIG. 2, the first detection board DP1, the third detection board DP3 and the fifth detection board DP5 are located in the first test pin header TN1 in FIG. 1. The second detection board DP2 and the fourth detection board DP4 are located in the second test pin header TN2 in FIG. 1.

Figure 3:
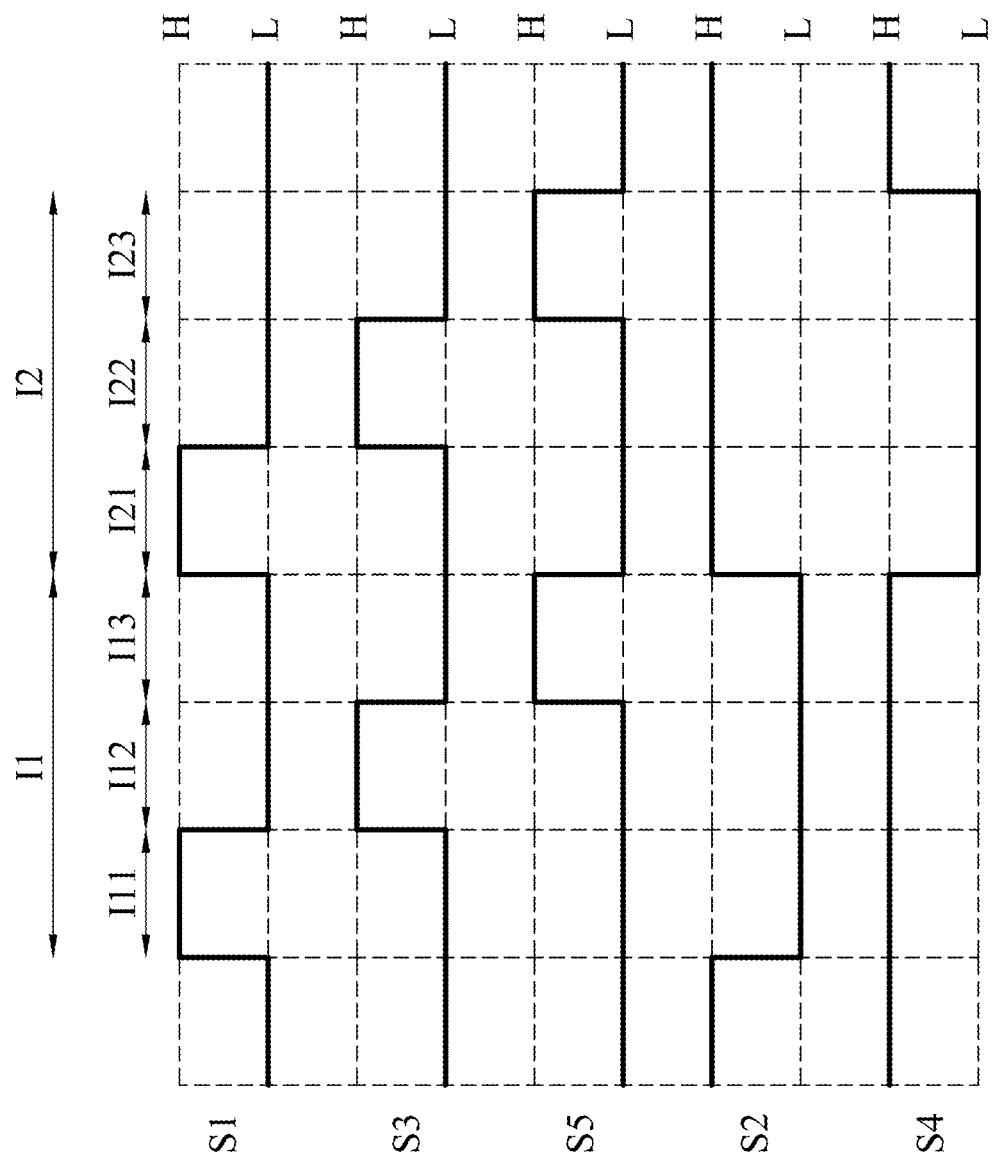
FIG. 3 depicts a signal timing diagram of a detection stage of a pixel detection device according to some embodiments of the present disclosure.
Figure 4:
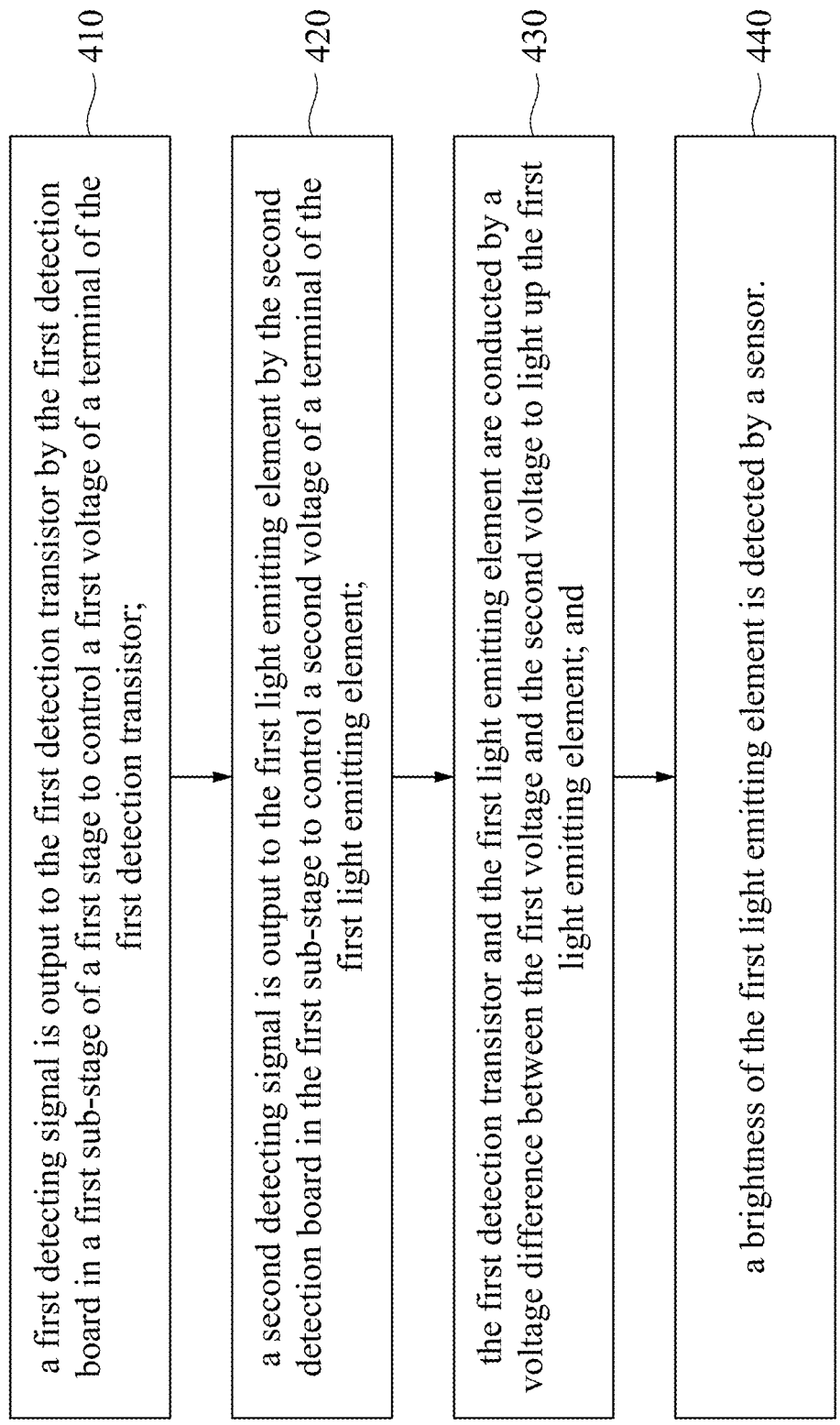
FIG. 4 depicts a flow chart of a pixel detection method according to some embodiments of the present disclosure.

In some embodiments, in order to facilitate the understanding of an operation of the pixel detection device 100, please refer to FIG. 2 to FIG. 4 together. FIG. 3 depicts a signal timing diagram of a detection stage of a pixel detection device 100 in FIG. 1 according to some embodiments of the present disclosure. FIG. 4 depicts a flow chart of a pixel detection method 400 according to some embodiments of the present disclosure.

In step 410, the first detecting signal S1 output by the first detection board DP1 in the first sub-stage I11 of the first stage I1 is switched from the first voltage level (e.g.: a low voltage level L) to the second voltage level (e.g.: a high voltage level H) to control the first voltage of the first terminal of the first detection transistor T1.

In step 420, the second detecting signal S2 output by the second detection board DP2 in the first sub-stage I11 is switched from the second voltage level (e.g.: the high voltage level H) to the first voltage level (e.g.: the low voltage level L) to control the second voltage of the second terminal of the first light emitting element D1.

In step 430, through a voltage difference between the first voltage and the second voltage, the first detection transistor T1 and the first light emitting element D1 are conducted to light up the first light emitting element D1. It should be noted that in the first sub-stage I11, the first detecting signal S1 is the second voltage level (e.g.: the high voltage level H), and the first driving circuit C1 do not operate in the detection stage (e.g.: no conduction).

In step 440, a brightness of the first light emitting element D1 is detected by a sensor (not shown in the figure) to detect whether the first light emitting element D1 is abnormal.

It should be noted that in order to detect whether the first light emitting element D1, an optical image of the first light emitting element D1 can be captured by a sensor (not shown in the figure) of an optical system, and a brightness, color, pixel distribution and other information in the optical image can be converted into digital image signals. Then, computers and programs can perform various mathematical operations on the digital image signals to extract various target features in the optical image, thereby analyzing and interpreting the content of the optical image. Finally, a judgment result of whether the first light emitting element D1 is abnormal is output according to a preset tolerance and other required conditions.

In some embodiments, the pixel detection method 400 further includes performing a plurality of steps similar to the steps 410 to 440 for each of the other pixels in the pixel detection device 100 to detect whether each of the other pixels are abnormal. Following description will take the second sub-pixel circuit G1, the third sub-pixel circuit R2, the fourth sub-pixel circuit G2, the fifth sub-pixel circuit B1 and the sixth sub-pixel circuit B2 as examples.

In some embodiments, please refer to FIG. 2 and FIG. 3, in the second sub-stage I12 of the first stage I1, the second detecting signal S2 output by the second detection board DP2 via a signal line L2 is maintained at the first voltage level (e.g.: the low voltage level L) to control a third voltage of the second terminal of the second light emitting element D2. The third detecting signal S3 output by the third detection board DP3 via a signal line L3 is switched from the first voltage level (e.g.: the low voltage level L) to the second voltage level (e.g.: the high voltage level H) to control a fourth voltage of the first terminal of the second detection transistor T2.

Then, second detection transistor T2 and the second light emitting element D2 are conducted in response to a voltage difference between the third voltage (i.e.: the low voltage level L of the second detecting signal S2) and the fourth voltage (i.e.: the high voltage level H of the third detecting signal S3) in the second sub-stage I12 to light up the second light emitting element D2. At this time, since the third detecting signal S3 has the second voltage level (e.g.: the high voltage level H), the second driving circuit C2 is not conducted.

In some embodiments, please refer to FIG. 2 and FIG. 3, in the third sub-stage I13 of the first stage I1, the second detecting signal S2 output by the second detection board DP2 via the signal line L2 is maintained at the first voltage level (e.g.: the low voltage level L). The fifth detecting signal S5 output by the fifth detection board DP5 via the signal line L5 is switched from the first voltage level (e.g.: the low voltage level L) to the second voltage level (e.g.: the high voltage level H) to control a voltage of the first terminal of the fifth detection transistor T5.

Then, the fifth detection transistor T5 and the fifth light emitting element D5 are conducted in response to a voltage difference between the first voltage level (e.g.: the low voltage level L) of the second detecting signal S2 and the second voltage level (e.g.: the high voltage level H) of the fifth detecting signal S5 in the third sub-stage I13 to light up the fifth light emitting element D5. At this time, since the fifth detecting signal S5 has the second voltage level (e.g.: the high voltage level H), the fifth driving circuit C5 is not conducted.

It should be noted that the first detection board DP1, the second detection board DP2, the third detection board DP3 and the fifth detection board DP5 are respectively configured to detect light emitting elements (e.g.: the first light emitting element D1, the second light emitting element D2 and the fifth light emitting element D5) of a plurality of sub-pixel circuits (e.g.: the first sub-pixel circuit R1, the second sub-pixel circuit G1 and the fifth sub-pixel circuit B1) in the same pixel row in the first stage I1.

In some embodiments, please refer to FIG. 2 and FIG. 3, in a fourth sub-stage I21 of a second stage I2, the first detecting signal S1 output by the first detection board DP1 via a signal line L1 is switched from the first voltage level (e.g.: the low voltage level L) to the second voltage level (e.g.: the high voltage level H) to control a fifth voltage of the first terminal of the third detection transistor T3. The fourth detecting signal S4 output by the fourth detection board DP4 via a signal line L4 is switched from the second voltage level (e.g.: the high voltage level H) to the first voltage level (e.g.: the low voltage level L) to control a sixth voltage of the second terminal of the third light emitting element D3.

Then, the third detection transistor T3 and the third light emitting element D3 are conducted in response to a voltage difference between the fifth voltage (i.e.: the second voltage level of the first detecting signal S1) and the sixth voltage (i.e.: the first voltage level of the fourth detecting signal S4) in the fourth sub-stage I21 to light up the third light emitting element D3. At this time, since the first detecting signal S1 has the second voltage level (e.g.: the high voltage level H), and the third driving circuit C3 is not conducted.

In some embodiments, please refer FIG. 2 and FIG. 3, in a fifth sub-stage I22 of the second stage I2, the fourth detecting signal S4 output by the fourth detection board DP4 via the signal line L4 is maintained at the first voltage level (e.g.: the low voltage level L) to a voltage of the second terminal of the fourth light emitting element D4. The third detecting signal S3 output by the third detection board DP3 via the signal line L3 is switched from the first voltage level (e.g.: the low voltage level L) to the second voltage level (e.g.: the high voltage level H) to control a voltage of the first terminal of the fourth detection transistor T4.

Then, the fourth detection transistor T4 and the fourth light emitting element D4 are conducted in response to a voltage difference between the second voltage level (e.g.: the high voltage level H) of the third detecting signal S3 and the first voltage level (e.g.: the low voltage level L) of the fourth detecting signal S4 in the fifth sub-stage I22 to light up the fourth light emitting element D4. At this time, since the third detecting signal S3 has the second voltage level (e.g.: the high voltage level H), and the fourth driving circuit C4 is not conducted.

In some embodiments, please refer to FIG. 2 and FIG. 3, in a sixth sub-stage I23 of the second stage I2, the fourth detecting signal S4 output by the fourth detection board DP4 via the signal line L4 is maintained at the first voltage level (e.g.: the low voltage level L) to control a voltage of the second terminal of the sixth light emitting element D6. The fifth detecting signal S5 output by the fifth detection board DP5 via a signal line L5 is switched from the first voltage level (e.g.: the low voltage level L) to the second voltage level (e.g.: the high voltage level H) to control a voltage of the first terminal of the sixth detection transistor T6.

Then, the sixth detection transistor T6 and the sixth light emitting element D6 are conducted in response to a voltage difference between the second voltage level (e.g.: the high voltage level H) of the fifth detecting signal S5 and the first voltage level (e.g.: the low voltage level L) of the fourth detecting signal S4 in the sixth sub-stage I23 to light up the sixth light emitting element D6. At this time, since the fifth detecting signal S5 has the second voltage level (e.g.: the high voltage level H), and the sixth driving circuit C6 is not conducted.

It should be noted that, in the detection stage, the aforementioned pixel detection device 100 is respectively configured to conduct a plurality of detection transistors in different pixel columns of the same pixel row in sequence, and then conduct a plurality of detection transistors in different pixel columns of the next pixel row in sequence.

It should be further noted that a number of each of the aforementioned sub-pixel circuits, detection boards, detection transistors and light emitting elements is not limited to embodiment of the figure.

Figure 5:
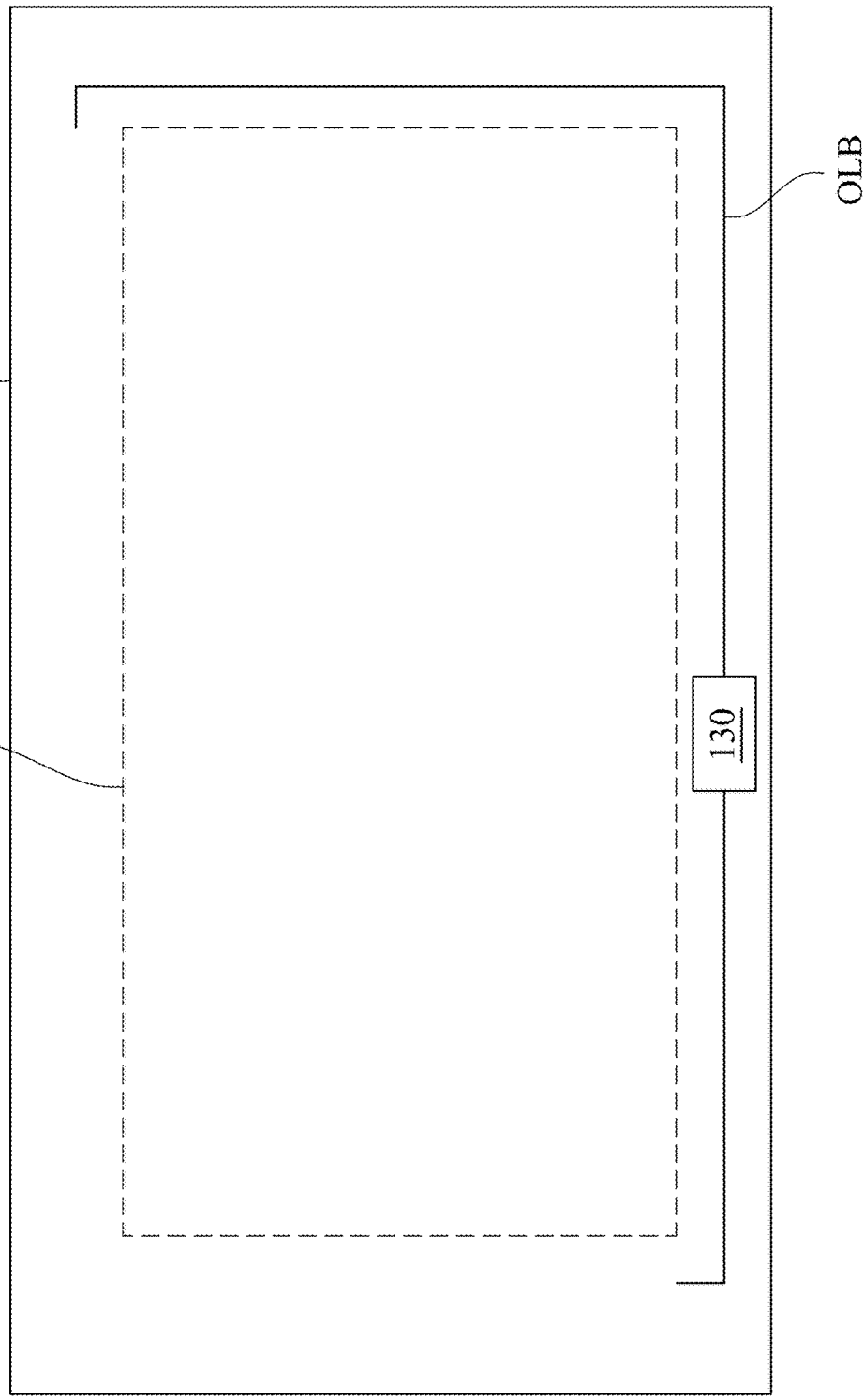
FIG. 5 depicts a schematic diagram of a second substrate of a pixel detection device according to some embodiments of the present disclosure.

FIG. 5 depicts a schematic diagram of a second substrate 120 of the pixel detection device 100 according to some embodiments of the present disclosure. In some embodiments, please refer to FIG. 5, the pixel detection device 100 includes the second substrate 120. The second substrate 120 includes a visible area AA, an integrated circuit 130 and an external pin bonding wire OLB.

Figure 6:
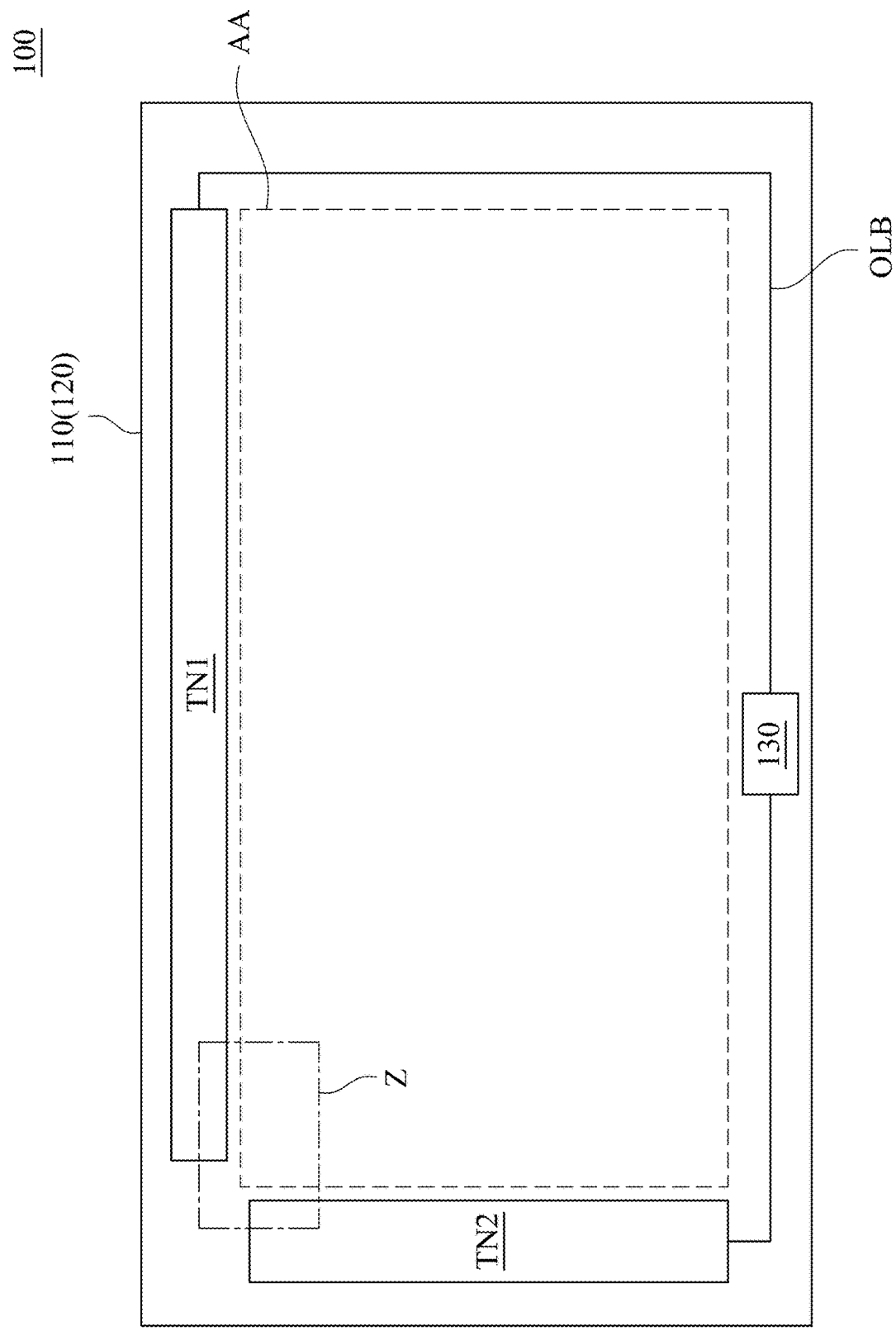
FIG. 6 depicts a schematic diagram of a combination of a first substrate and a second substrate of a pixel detection device according to some embodiments of the present disclosure.

FIG. 6 depicts a schematic diagram of a combination of the first substrate 110 and the second substrate 120 of the pixel detection device 100. In some embodiments, please refer to FIG. 1, FIG. 5 and FIG. 6, embodiment in FIG. 6 is a top view of a structural combination of the embodiment in FIG. 1 and the embodiment in FIG. 5.

Figure 7:
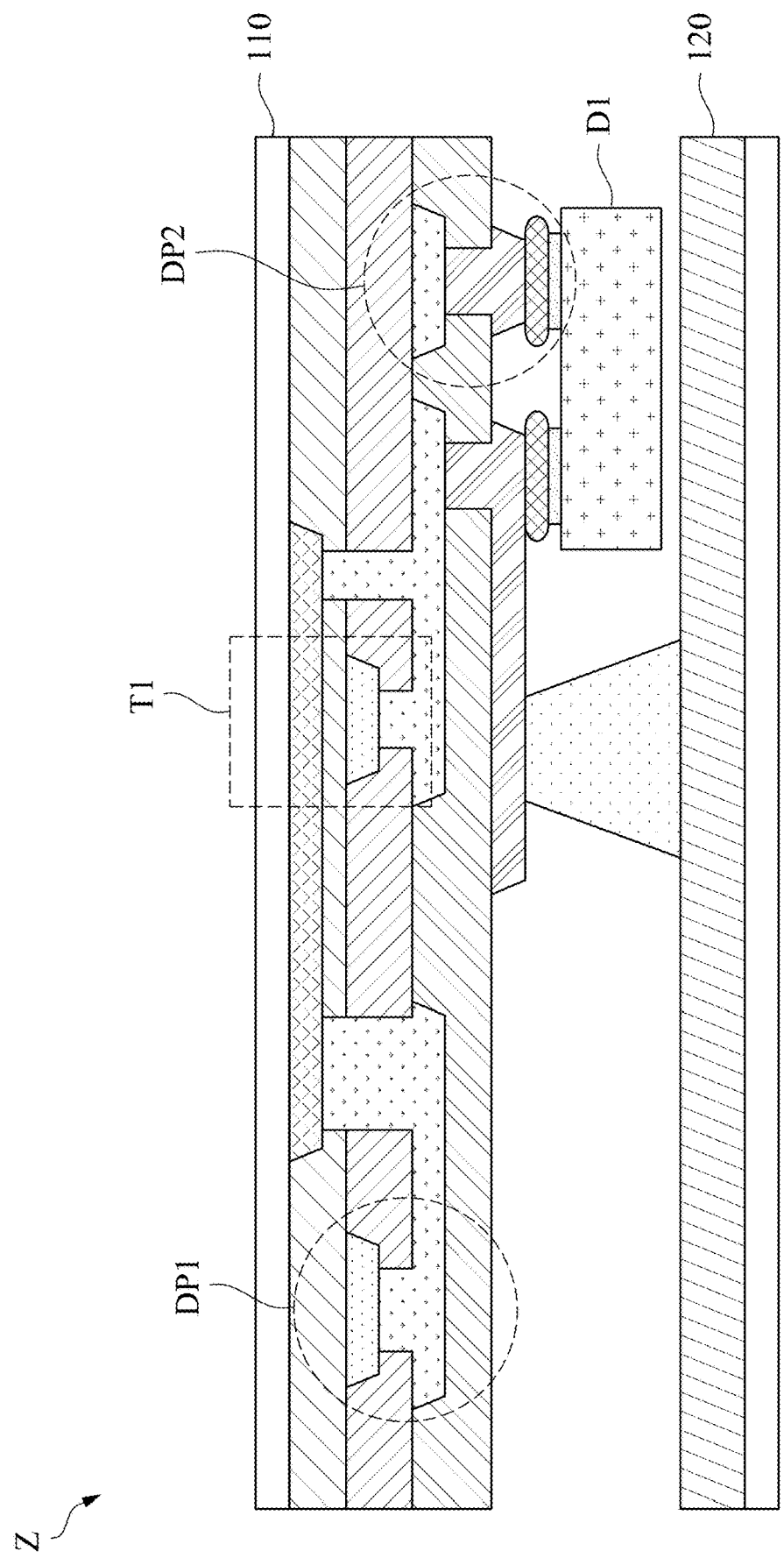
FIG. 7 depicts a schematic side view of a combination structure of a first substrate and a second substrate of a pixel detection device according to some embodiments of the present disclosure.

FIG. 7 depicts a schematic side view of a combination structure of the first substrate 110 and the second substrate 120 of the pixel detection device 100 in FIG. 6. In some embodiments, please refer to FIG. 2 and FIG. 7, the second substrate 120 is located below the first substrate 110, and is configured to combine with the first substrate 110. The first detection board DP1, the second detection board DP2, the first detection transistor T1 and the first light emitting element D1 in the embodiment in FIG. 7 correspond to the first detection board DP1, the second detection board DP2, the first detection transistor T1 and the first light emitting element D1 in the embodiment in FIG. 2.

Please refer to FIG. 2 and FIG. 7, the second substrate 120 includes a plurality of additional sub-pixel circuits (not shown in the figure) that are different from the sub-pixel circuits in FIG. 2. A plurality of sub-pixel circuits on the second substrate 120 respectively corresponds in position to the plurality of sub-pixel circuits in FIG. 2. It should be further noted that a number of a plurality of sub-pixel circuits of the second substrate 120 is bigger than a number of a plurality of sub-pixel circuits of the first substrate 110.

Figure 8:
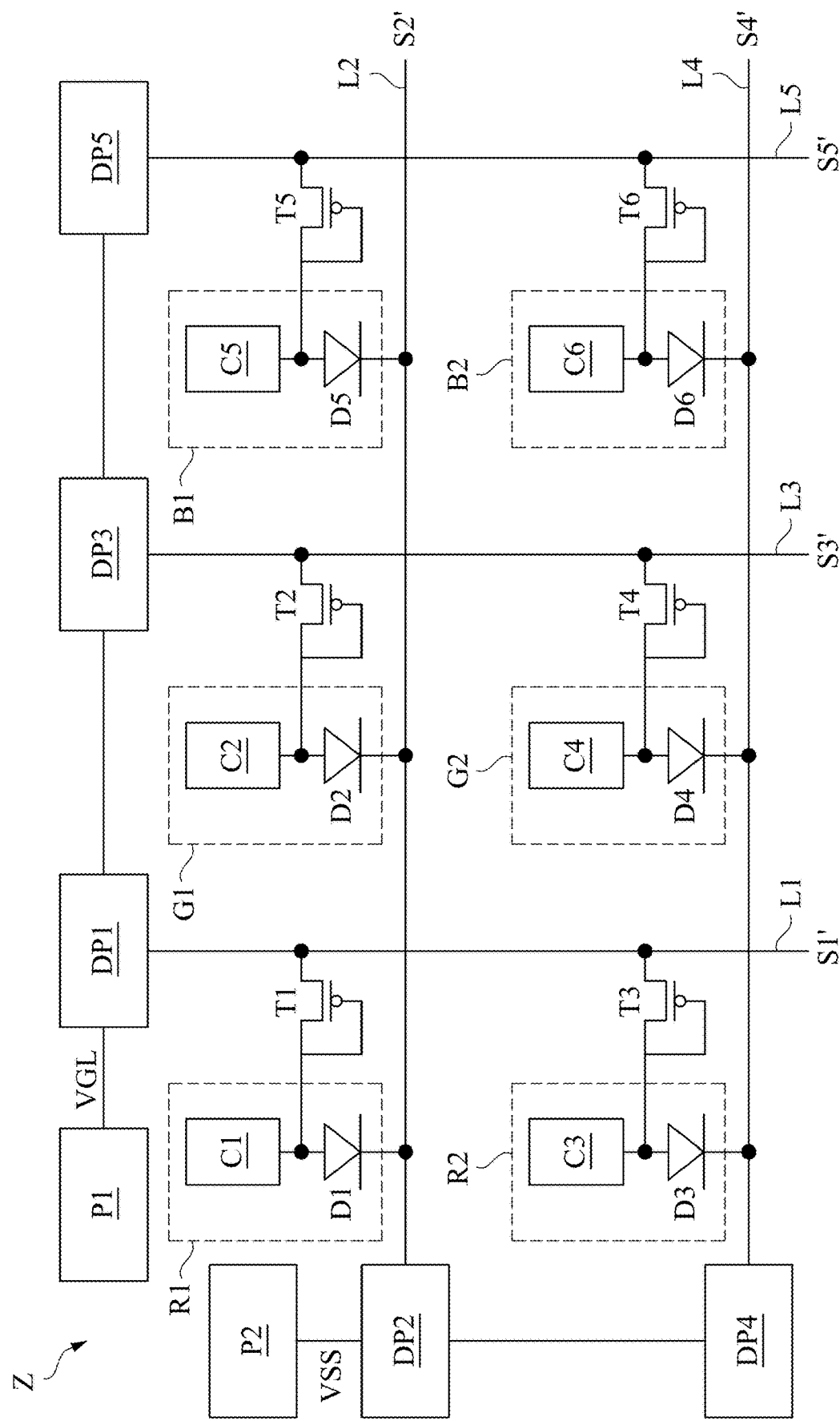
FIG. 8 depicts a schematic diagram of a pixel detection device according to some embodiments of the present disclosure.

FIG. 8 depicts a schematic diagram of a part of an area Z of a pixel detection device 100 in FIG. 6 according to some embodiments of the present disclosure. In some embodiments, after the first substrate 110 and the second substrate 120 are combined, the first detection board DP1, the third detection board DP3 and the fifth detection board DP5 are connected with each other and are coupled to the first system low voltage VGL of the first system voltage source P1. The second detection board DP2 and the fourth detection board DP4 are connected with each other and are coupled to the second system low voltage VSS of the second system voltage source P2. The first system low voltage VGL is different from the second system low voltage VSS.

Figure 9:
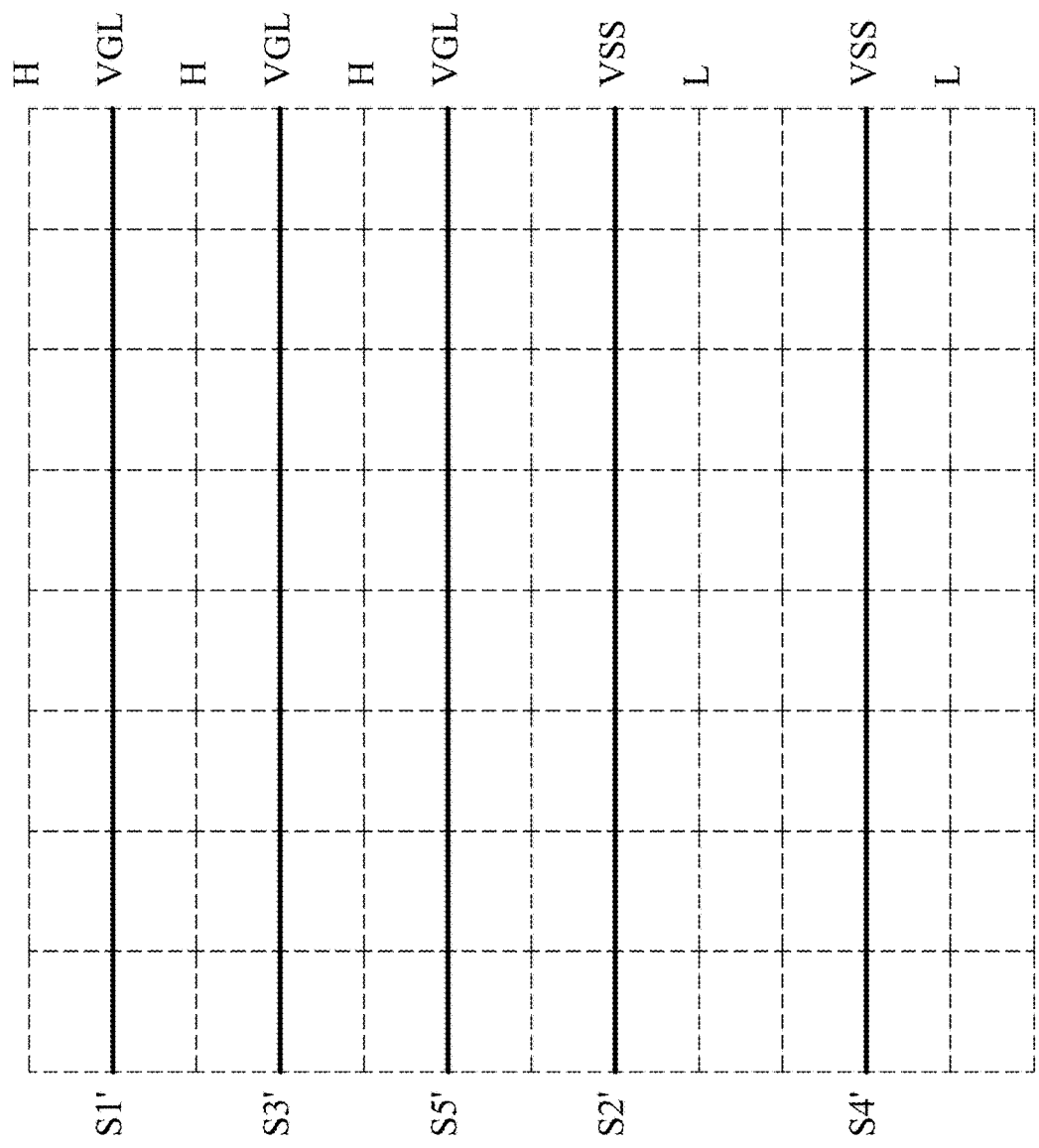
FIG. 9 depicts a signal timing diagram of a display stage of a pixel detection device according to some embodiments of the present disclosure.

FIG. 9 depicts a signal timing diagram of a display stage of a pixel detection device 100 according to some embodiments of the present disclosure. In some embodiments, please refer to FIG. 8 and FIG. 9, in the display stage, each of a signal S1' output by the first detection board DP1, a signal S3' output by the third detection board DP3 and a signal S5' output by the detection board DP5 is the first system low voltage VGL. Each of a signal S2' output by the second detection board DP2 and a signal S4' output by the fourth detection board DP4 is the second system low voltage VSS. The first system low voltage VGL is lower than the second system low voltage VSS.

At this time, the first detection transistor T1, the second detection transistor T2, the third detection transistor T3, the fourth detection transistor T4, the fifth detection transistor T5 and the sixth detection transistor T6 are not conducted in response to the first system low voltage VGL and the second system low voltage VSS. In other word, diode connection transistors formed by the first detection transistor T1 to the sixth detection transistor T6 are all in a reverse biased state. In this way, after detections of the first light emitting element D1 to the sixth light emitting element D6 are completed, the first detection transistor T1 to the sixth detection transistor T6 will not affect a normal operation of each of sub-pixel circuits.

Based on the aforementioned embodiments, the present disclosure provides a pixel detection device and a pixel detection method. Through the diode connection method of the detection transistor of the present disclosure, abnormal pixel circuits can be detected during a manufacturing process to avoid consuming process costs and time costs. In addition, detection boards on both sides are coupled to two system low voltages respectively, so that a plurality of detection transistors are not conducted. a plurality of detection transistors does not affect a normal display operation of the light emitting elements, so there is no need to remove s plurality of detection transistors after a detection of the light emitting element is completed.

Certain terms are used in the specification and the claims to refer to specific components. However, those of ordinary skill in the art would understand that the same components may be referred to by different terms. The specification and claims do not use the differences in terms as a way to distinguish components, but the differences in functions of the components are used as a basis for distinguishing. Furthermore, it should be understood that the term "comprising" used in the specification and claims is open-ended, that is, including but not limited to. In addition, "coupling" herein includes any direct and indirect connection means. Therefore, if it is described that the first component is coupled to the second component, it means that the first component can be directly connected to the second component through electrical connection or signal connections including wireless transmission, optical transmission, and the like, or the first component is indirectly electrically or signally connected to the second component through other component(s) or connection means.

It will be understood that, in the description herein and throughout the claims that follow, the phrase "and/or" includes any and all combinations of one or more of the associated listed items. Unless the context clearly dictates otherwise, the singular terms used herein include plural referents.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A pixel detection device, comprising:
   a first substrate, comprising:
      a first sub-pixel circuit, wherein the first sub-pixel circuit comprises a first light emitting element;
      a first detection transistor, coupled to the first light emitting element;
      a first detection board, coupled to the first detection transistor; and
      a second detection board, coupled to the first light emitting element;
      wherein the first detection board is configured to output a first detecting signal in a first sub-stage of a first stage, and the first detecting signal is switched from a first voltage level to a second voltage level to control a first voltage of the first detection transistor, wherein the second detection board is configured to output a second detecting signal in the first sub-stage, and the second detecting signal is switched from second voltage level to the first voltage level to control a second voltage of the first light emitting element, wherein the first detection transistor and the first light emitting element are conducted according to the first voltage and the second voltage to light up the first light emitting element, so as to detect whether a brightness of the first light emitting element is abnormal.

2. The pixel detection device of claim 1, wherein the first light emitting element comprises:
   a first terminal, coupled to the first detection transistor; and
   a second terminal, coupled to the second detection board.

3. The pixel detection device of claim 2, wherein the first detection transistor comprises:
   a first terminal, coupled to the first detection board;
   a second terminal, coupled to the first terminal of the first light emitting element;
   a control terminal, coupled to the second terminal of the first detection transistor and the first terminal of the first light emitting element, wherein the first detection transistor is conducted in response to a cross voltage between the first terminal and the second terminal of the first detection transistor.

4. The pixel detection device of claim 1, wherein the first substrate further comprises:
   a second sub-pixel circuit, wherein the second sub-pixel circuit comprises a second light emitting element, wherein the second light emitting element is coupled to the second detection board;
   a second detection transistor, coupled to the second light emitting element; and
   a third detection board, coupled to the second detection transistor, and configured to output a third detecting signal in a second sub-stage of the first stage, and the third detecting signal is switched from the first voltage level to the second voltage level to control a third voltage of the second detection transistor.

5. The pixel detection device of claim 4, wherein the second detection board is further configured to maintain the first voltage level in the second sub-stage to control a fourth voltage of the second light emitting element.

6. The pixel detection device of claim 5, wherein the second detection transistor and the second light emitting element are conducted according to the third voltage and the fourth voltage to light up the second light emitting element so as to detect whether the second light emitting element is abnormal.

7. The pixel detection device of claim 6, wherein the first sub-pixel circuit and the second sub-pixel circuit are located in a same pixel row.

8. The pixel detection device of claim 4, wherein the first substrate further comprises:
   a third sub-pixel circuit, wherein the third sub-pixel circuit comprises a third light emitting element;
   a third detection transistor, coupled to the third light emitting element and the first detection board; and
   a fourth detection board, coupled to the third light emitting element, and configured to output a fourth detecting signal in a second stage to switch from the second voltage level to the first voltage level to control a fifth voltage of the third light emitting element.

9. The pixel detection device of claim 8, wherein the first detection board is further configured to output the first detecting signal in the second stage to switch from the first voltage level to the second voltage level to control a six voltage of the third light emitting element.

10. The pixel detection device of claim 9, wherein the third light emitting element and the third detection transistor are conducted according to the fifth voltage and the six voltage to light up the third light emitting element so as to detect whether the third light emitting element is abnormal.

11. The pixel detection device of claim 10, wherein the first sub-pixel circuit and the third sub-pixel circuit are located in a same pixel column, wherein the second sub-pixel circuit and the third sub-pixel circuit are located in different pixel rows.

12. The pixel detection device of claim 11, further comprising:
   a second substrate, located below the first substrate, and configured to combine with the first substrate, wherein when the first substrate and the second substrate are combined with each other, the first detection board and the third detection board are coupled to a first system low voltage, wherein the second detection board and the fourth detection board are coupled to a second system low voltage, wherein the first system low voltage is different from the second system low voltage.

13. The pixel detection device of claim 12, wherein the first detection transistor, the second detection transistor and the third detection transistor are all not conducted in response to the first system low voltage and the second system low voltage.

14. The pixel detection device of claim 13, wherein the first system low voltage is lower than the second system low voltage.

15. A pixel detection method, for driving a pixel detection device, wherein the pixel detection device comprises a first sub-pixel circuit, a first detection transistor, a first detection board and a second detection board, wherein the first sub-pixel circuit comprises a first light emitting element, wherein the first detection transistor is coupled to the first light emitting element, the first detection board is coupled to the first detection transistor and the second detection board is coupled to the first light emitting element, wherein the pixel detection method comprises:
   outputting a first detecting signal to the first detection transistor by the first detection board in a first sub-stage of a first stage to control a first voltage of a terminal of the first detection transistor;
   outputting a second detecting signal to the first light emitting element by the second detection board in the first sub-stage to control a second voltage of a terminal of the first light emitting element;
   conducting the first detection transistor and the first light emitting element by a voltage difference between the first voltage and the second voltage to light up the first light emitting element; and
   detecting a brightness of the first light emitting element by a sensor.

16. The pixel detection method of claim 15, wherein the pixel detection device further comprises a second sub-pixel circuit, a second detection transistor and a third detection board, wherein the second sub-pixel circuit comprises a second light emitting element, wherein the second detection transistor is coupled to the second light emitting element, the third detection board is coupled to the second detection transistor, the second detection board is coupled to the second light emitting element, wherein the pixel detection method further comprises:
   outputting the second detecting signal to the second light emitting element by the second detection board in a second sub-stage of the first stage to control a third voltage of a terminal of the second light emitting element;
   outputting a third detecting signal to the second detection transistor by the third detection board in the second sub-stage to control a fourth voltage of a terminal of the second detection transistor;
   conducting the second detection transistor and the second light emitting element by a voltage difference between the third voltage and the fourth voltage to light up the second light emitting element; and
   detecting whether a brightness of the second light emitting element is abnormal by the sensor.

17. The pixel detection method of claim 16, wherein the first sub-pixel circuit and the second sub-pixel circuit are located in a same pixel row.

18. The pixel detection method of claim 17, wherein the pixel detection device further comprises a third sub-pixel circuit, a third detection transistor and a fourth detection board, wherein the third sub-pixel circuit comprises a third light emitting element, wherein the third detection transistor is coupled to the third light emitting element, the first detection board is coupled to the third detection transistor and the fourth detection board is coupled to second light emitting element, wherein the pixel detection method further comprises:
   outputting the first detecting signal to the third detection transistor by the first detection board in a second stage to control a fifth voltage of a terminal of the third detection transistor;
   outputting a fourth detecting signal to the third light emitting element by the fourth detection board in the second stage to control a sixth voltage of a terminal of the third light emitting element;
   conducting the third detection transistor and the third light emitting element by a voltage difference between the fifth voltage and the sixth voltage to light up the third light emitting element; and
   detecting whether a brightness of the third light emitting element is abnormal by the sensor.

19. The pixel detection method of claim 18, wherein the first sub-pixel circuit and the third sub-pixel circuit are located in a same pixel column, wherein the second sub-pixel circuit and the third sub-pixel circuit are located in different pixel rows.

20. The pixel detection method of claim 19, further comprising:
- coupling the first detection board and the third detection board to a first system low voltage; and
- coupling the second detection board and the fourth detection board to a second system low voltage, wherein the first system low voltage is different from the second system low voltage.

* * * * *